(12) United States Patent
Ishimoto (10) Patent No.: US 7,394,734 B2
(45) Date of Patent: Jul. 1, 2008

(54) OPTICAL DISK DRIVE USING NEAR-FIELD LIGHT, OPTICAL DISK APPARATUS, AND METHOD FOR DRIVING THE APPARATUS

(75) Inventor: Tsutomu Ishimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 83 days.

(21) Appl. No.: 11/436,809

(22) Filed: May 19, 2006

(65) Prior Publication Data

US 2006/0280063 A1 Dec. 14, 2006

(30) Foreign Application Priority Data

May 24, 2005 (JP) .............................. 2005-150743

(51) Int. Cl.
*G11B 7/00* (2006.01)
(52) U.S. Cl. ................... 369/44.35; 369/53.28
(58) Field of Classification Search ....................... None
See application file for complete search history.

(56) References Cited

U.S. PATENT DOCUMENTS

| | | | |
|---|---|---|---|
| 5,125,750 A | 6/1992 | Corle et al. | |
| 6,717,896 B1 * | 4/2004 | Imanishi | 369/53.27 |
| 6,791,913 B1 | 9/2004 | Ishimoto | |
| 7,099,259 B2 * | 8/2006 | Imanishi | 369/112.24 |
| 2001/0021145 A1 * | 9/2001 | Ichimura et al. | 369/43 |
| 2002/0163869 A1 * | 11/2002 | Ishimoto | 369/53.37 |
| 2004/0100878 A1 * | 5/2004 | Chu et al. | 369/44.23 |
| 2006/0274610 A1 * | 12/2006 | Saito et al. | 369/13.33 |
| 2007/0183298 A1 * | 8/2007 | Saito et al. | 369/112.16 |

FOREIGN PATENT DOCUMENTS

JP 2004-30821 1/2004

* cited by examiner

*Primary Examiner*—Paul W. Huber
(74) *Attorney, Agent, or Firm*—Oblon, Spivak, McClelland, Maier & Neustadt, P.C.

(57) ABSTRACT

An optical disk drive includes a light source, a light focusing element, a light-focusing-element moving mechanism, a detecting unit, a holding unit, and first and second control units. The light focusing element arranged so as to be opposed to a disk on which a signal is recordable is capable of focusing light emitted from the light source as near-field light on the disk. The detecting unit detects a state where the moving mechanism approaches the light focusing element to the disk such that the light is focused as near-field light on the disk and outputs a detection signal upon detection. The holding unit holds a voltage applied to the mechanism in response to the detection signal and is capable of releasing the held voltage. The first and second control units perform first and second control operations to control the distance between the light focusing element and the disk.

13 Claims, 9 Drawing Sheets

OPTICAL DISK DRIVE USING NEAR-FIELD LIGHT, OPTICAL DISK APPARATUS, AND METHOD FOR DRIVING THE APPARATUS

CROSS REFERENCES TO RELATED APPLICATIONS

The present invention contains subject matter related to Japanese Patent Application JP 2005-150743 filed in the Japanese Patent Office on May 24, 2005, the entire contents of which are incorporated herein by reference.

BACKGROUND OF THE INVENTION

1. Field of the Invention

The present invention relates to an optical disk drive for performing at least one of writing and reading of signals using near-field light, an optical disk apparatus mounted with the drive, and a method for driving the apparatus.

2. Description of the Related Art

To increase the recording density of an optical disk on which data is written or read using laser light, an optical disk apparatus for writing or reading signals using near-field light has recently been proposed. According to a proposed technique for the optical disk apparatus utilizing near-field light, a gap between an optical disk and the end surface of a solid immersion lens (SIL) disposed in a light focusing element, such as an objective lens unit, is controlled to be a distance (near field) where near-field light is generated. The distance is generally half the wavelength of input laser light. For example, in the use of blue-violet laser light with a 400-nm wavelength, the distance is approximately 200 nm.

Upon starting control of the gap, an overshoot of 1 µm or less may occur. In a far-field optical system in an optical disk apparatus for writing or reading signals on a compact disk (CD) or a digital versatile disk (DVD), the overshoot is insignificant. In an optical recording and playback apparatus using near-field light, the overshoot is a serious problem. In other words, if the overshoot of 1 µm or less occurs upon starting the control, the SIL collides with the disk, resulting in damages of them.

One approach to solving the above-mentioned problem uses a technique for controlling the gap on the basis of the amount of returning laser light reflected from the disk. For instance, in the case of using laser light of a 400-nm wavelength, when the gap length is generally half the wavelength or less, a near-field state is produced. Accordingly, assuming that the gap is more than 200 nm, i.e., in a far-field state, when light emitted from a laser source is incident on the end surface of the SIL at an angle at which total reflection occurs, the light is totally reflected by the end surface of the SIL, so that the amount of returning light is constant. When the gap length is 200 nm or less, i.e., in the near-field state, light incident on the end surface of the SIL at the angle of total reflection partially passes through the end surface thereof, so that the amount of returning light is reduced. When the gap between the SIL and the disk is zero, i.e., when the SIL is in contact with the disk, the entire light incident on the end surface of the SIL at the angle of total reflection passes through the end surface thereof, so that the amount of returning light is zero. In this technique, the amount of returning light is detected by a photodetector and data indicating the detected amount is fed back to an actuator (e.g., a two-axis device for performing focusing servo and tracking servo operations) for the SIL, whereby a gap servo operation is performed. This approach is disclosed in, e.g., U.S. Pat. No. 6,701,913 (Patent Document 1).

Another approach utilizes a technique for setting a threshold used to determine, e.g., whether the near-field state is produced, approaching the SIL to the disk until the threshold is detected, adding a servo voltage to an approach voltage after the threshold is detected, and then performing the gap servo operation. This approach is disclosed in, e.g., Japanese Unexamined Patent Application Publication No. 2004-30821 (Patent Document 2). In this case, the approach voltage is a ramped voltage (see FIG. 8 of Patent Document 2). Since the SIL is moved at the initial velocity upon starting to approach to the disk, the SIL fluctuates at the start of the approach (refer to FIG. 12 of Patent Document 2). After that, the SIL is moved in accordance with the ramped voltage that is reduced to a target value (corresponding to a target gap of several tens of nm).

SUMMARY OF THE INVENTION

In an apparatus disclosed in Patent Document 2, however, there is concern about the fluctuation of the SIL caused by the initial velocity of the SIL upon starting the approach. Therefore, any means has to be devised to increase a margin to avoid collision between the SIL and the disk and more stably approach the SIL to the near field or a target point in the near-field.

In consideration of the above-described circumstances, it is desirable to provide an optical disk drive capable of reliably preventing collision between a light focusing element and an optical disk, an optical disk apparatus mounted with the drive, and a method for driving the apparatus.

According to an embodiment of the present invention, there is provided an optical disk drive including the following elements. A light source emits light. A light focusing element arranged so as to be opposed to a disk on which a signal is recordable is capable of focusing the light emitted from the light source as near-field light on the disk. A moving mechanism is configured to move the light focusing element closer to or farther away from the disk on the basis of a change in voltage. A detecting unit is configured to detect a state where the moving mechanism approaches the light focusing element to the disk such that the distance between the light focusing element and the disk is equal to a first distance where the light is focused as near-field light on the disk through the light focusing element and to output a detection signal upon detecting the state. A holding unit is configured to hold a voltage applied to the moving mechanism in response to the detection signal output from the detecting unit. The holding unit is capable of releasing the held voltage. A first control unit is configured to perform a first control operation of applying a voltage, whose maximum value is equal to the held voltage, to the moving mechanism so that the distance between the light focusing element and the disk is equal to or smaller than the first distance while the held voltage is released. A second control unit is configured to perform a second control operation of controlling the distance between the light focusing element and the disk to a second distance smaller than the first distance on the basis of the detection signal while the distance therebetween is equal to or smaller than the first distance.

According to this embodiment, the optical disk drive may further include a switch for switching from the first control operation by the first control unit to the second control operation by the second control unit in response to a detection signal output from the detecting unit.

According to this embodiment, preferably, the second control unit performs the second control operation while the maximum voltage is being applied to the moving mechanism through the first control unit.

According to this embodiment, the detecting unit may include a measuring unit for measuring the amount of returning light that is emitted from the light source and is then reflected by the light focusing element, and the first or second control unit may perform the control operation on the basis of the amount of returning light measured by the measuring unit.

According to this embodiment, the light focusing element may include a solid immersion lens.

According to this embodiment, preferably, the light emitted from the light source is blue or blue-violet laser light.

According to another embodiment of the present invention, there is provided an optical disk apparatus including the following elements. A light source emits light. A light focusing element arranged so as to be opposed to a disk on which a signal is recordable is capable of focusing the light emitted from the light source as near-field light on the disk. A moving mechanism is configured to move the light focusing element closer to or farther away from the disk on the basis of a change in voltage. A detecting unit is configured to detect a state where the moving mechanism approaches the light focusing element to the disk such that the distance between the light focusing element and the disk is equal to a first distance where the light is focused as near-field light on the disk through the light focusing element and outputting a detection signal upon detecting the state. A holding unit is configured to hold a voltage applied to the moving mechanism in response to the detection signal output from the detecting unit. The holding unit is capable of releasing the held voltage. A first control unit is configured to perform a first control operation of applying a voltage, whose maximum value is equal to the held voltage, to the moving mechanism so that the distance between the light focusing element and the disk is equal to or smaller than the first distance while the held voltage is released. A second control unit is configured to perform a second control operation of controlling the distance between the light focusing element and the disk to a second distance smaller than the first distance on the basis of the detection signal while the distance therebetween is equal to or smaller than the first distance. A writing/reading mechanism is capable of performing at least one of writing and reading of the signal to/from the disk while the distance therebetween is being controlled to the second distance through the second control unit.

According to this embodiment, the optical disk apparatus may further include a switch for switching from the first control operation by the first control unit to the second control operation by the second control unit in response to a detection signal output from the detecting unit.

According to this embodiment, the second control unit may perform the second control operation while the maximum voltage is being applied to the moving mechanism through the first control unit.

According to this embodiment, the detecting unit may include a measuring unit for measuring the amount of returning light that is emitted from the light source and is then reflected by the light focusing element, and the first or second control unit may perform the control operation on the basis of the amount of returning light measured by the measuring unit.

According to this embodiment, the light focusing element may include a solid immersion lens.

According to this embodiment, preferably, the light emitted from the light source is blue or blue-violet laser light.

According to another embodiment of the present invention, there is provided a method for driving an optical disk drive including a light source that emits light, a light focusing element which is arranged so as to be opposed to a disk on which a signal is recordable and is capable of focusing the light emitted from the light source as near-field light on the disk, and a moving mechanism for moving the light focusing element closer to or farther away from the disk on the basis of a change in voltage. The method includes the steps of: detecting a state where the moving mechanism approaches the light focusing element to the disk such that the distance between the light focusing element and the disk is equal to a first distance where the light is focused as near-field light on the disk through the light focusing element; outputting a detection signal when the state is detected; holding a voltage applied to the moving mechanism in response to the detection signal; releasing the held voltage; performing a first control operation of applying a voltage, whose maximum value is equal to the held voltage, to the moving mechanism so that the distance between the light focusing element and the disk is equal to or smaller than the first distance while the held voltage is released; and performing a second control operation of controlling the distance between the light focusing element and the disk to a second distance smaller than the first distance on the basis of the detection signal while the distance therebetween is equal to or smaller than the first distance.

As described above, according to the present invention, collision between a light focusing element and an optical disk can be prevented reliably.

DESCRIPTION OF THE PREFERRED EMBODIMENTS

An embodiment of the present invention will now be described below with reference to the drawings.

Figure 1:
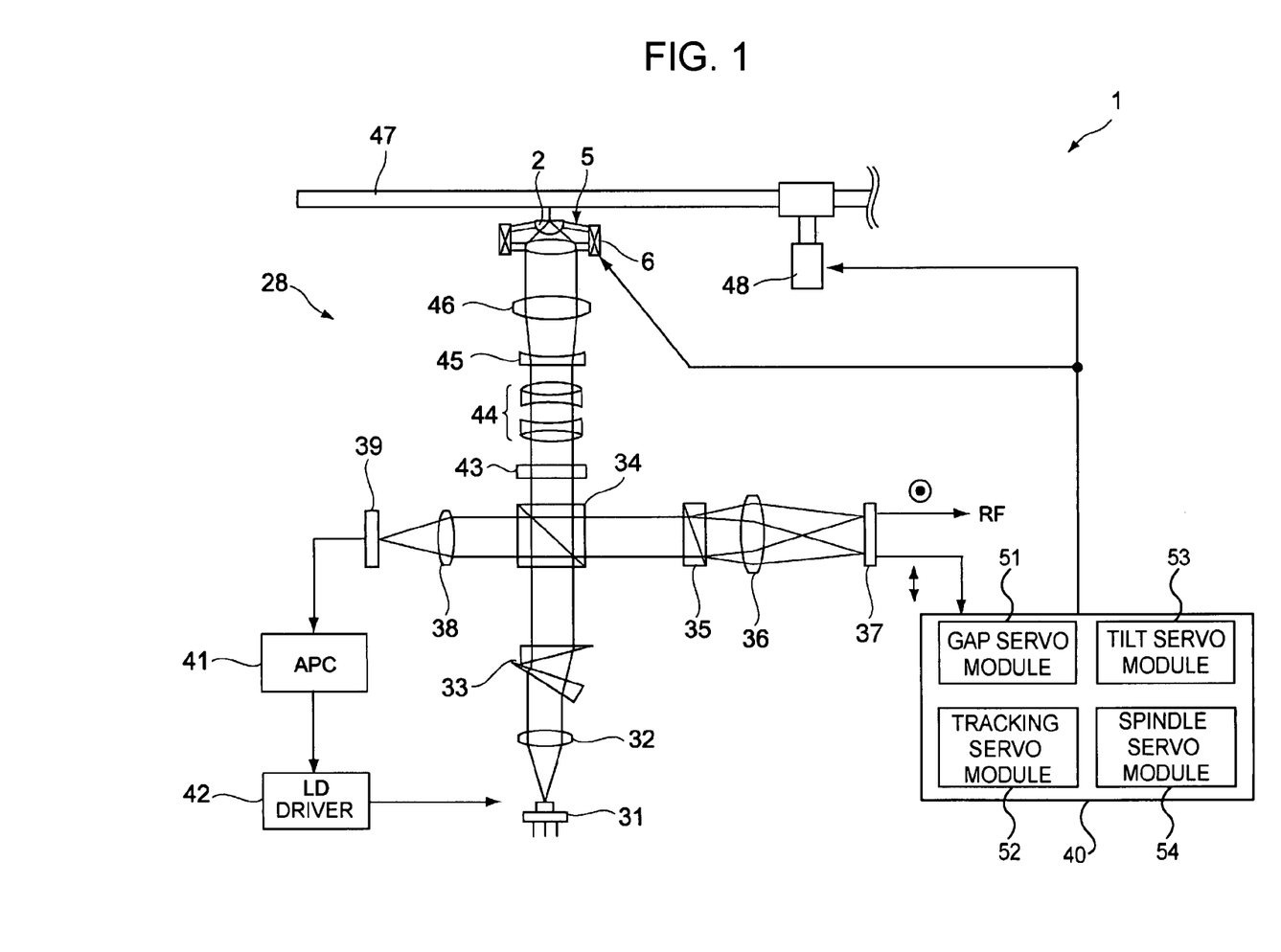
FIG. 1 is a diagram showing the structure of an optical disk drive according to an embodiment of the present invention.

FIG. 1 is a diagram of the structure of an optical disk drive according to one embodiment of the present invention. An optical disk drive 1 includes an optical head 28, a servo controller 40, and a spindle motor 48. The optical head 28 includes: a laser diode (LD) 31, serving as a light source; collimator lenses 32 and 46; an anamorphic prism pair 33 for shaping laser light; a beam splitter (BS) 34; a quarter wave plate (QWP) 43; an achromatic lens 44; a diverging lens 45 that diverges a laser beam; a Wollaston prism 35; converging lenses 36 and 38; a light focusing element 5; photodetectors (PDs) 37 and 39; an automatic power controller (APC) 41; and an LD driver 42.

The Wollaston prism 35 consists of two prisms. The Wollaston prism 35 permits incident light to pass through as two beams which are mutually perpendicularly polarized. The PD 37 outputs an RF read signal to read a signal written on an optical disk, and a tracking error signal and a gap error signal which are necessary for servo controls to the servo controller 40.

The servo controller 40 includes a gap servo module 51, which will be describe later, a tracking servo module 52, a tilt servo module 53, and a spindle servo module 54. The tracking servo module 52 controls the tracking operation of the light focusing element 5 in accordance with a tracking error signal. The tilt servo module 53 controls the tilt angle of the light focusing element 5. The spindle servo module 54 controls the rotation of the spindle motor 48.

The APC 41 outputs a predetermined signal to the LD driver 42 on the basis of a signal output from the PD 39 so that the power of laser light output from the LD 31 is constant.

The operation of the optical disk drive 1 will now be described. For example, an optical disk 47, serving as a recording medium, is loaded into the optical disk drive 1. Laser light emitted from the LD 31 is collimated through the collimator lens 32 and is then shaped through the anamorphic prism pair 33. The laser light incident on the BS 34 is split into a beam that is incident on the QWP 43 and a beam that is incident on the converging lens 38. The power of the beam incident on the converging lens 38 is controlled to be constant by the APC 41 as mentioned above. As for the beam incident on the QWP 43, the incident beam, which is linearly polarized, is circularly polarized by the QWP 43. The resultant beam is subjected to correction for chromatic aberration by the achromatic lens 44. The resultant beam passes through the diverging lens 45 and the collimator lens 46 and is then incident on the light focusing element 5.

The laser beam incident on the light focusing element 5 is focused as near-field light, which will be described below, on the optical disk 47 to write a signal to the optical disk 47. Alternatively, the laser beam focused as near-field light on the optical disk 47 is incident on the optical disk 47 to read a signal written on the optical disk 47. Light reflected or diffracted by the optical disk 47 is received by the light focusing element 5. The received light, serving as returning light, passes through the light focusing element 5, the collimator lens 46, the diverging lens 45, the achromatic lens 44, and the QWP 43, and is then incident on the BS 34. The incident light is totally reflected by the BS 34 and is then incident on the PD 37 through the Wollaston prism 35 and the converging lens 36. An RF read signal and servo control signals are generated by the PD 37. The servo control signals are supplied to the servo controller 40, so that the servo controls are performed.

Figure 2:
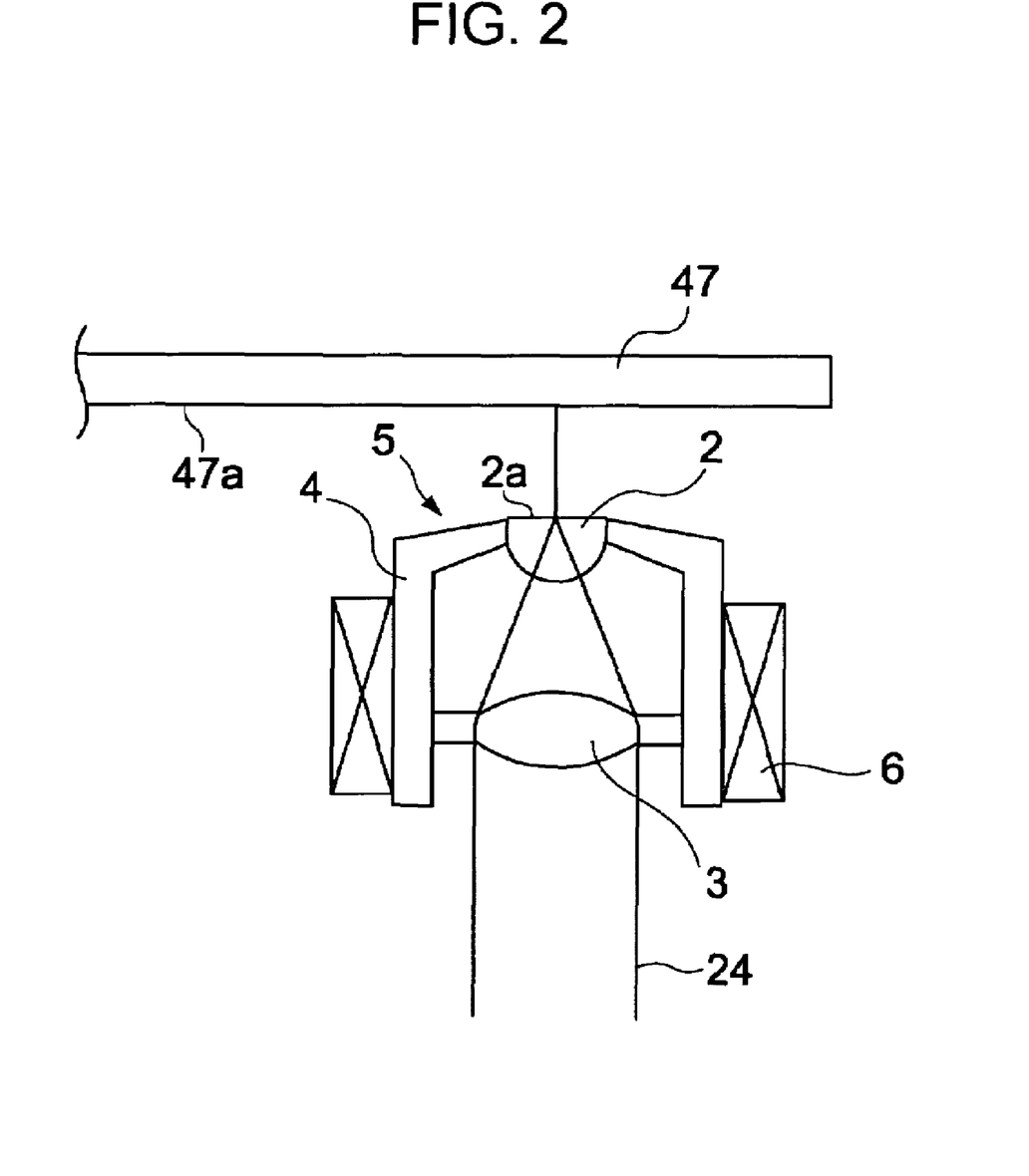
FIG. 2 is a side plan view showing a light focusing element and an optical disk.

FIG. 2 is a side plan view showing the light focusing element 5 and the optical disk 47. The light focusing element 5 is opposed to the optical disk 47. The light focusing element 5 includes an SIL 2, an aspheric lens 3, and a lens holder 4. The lens holder 4 receives the SIL 2 and the aspheric lens 3. The structure of the light focusing element 5 is not limited to the above. The light focusing element 5 may be configured to guide laser light 24 as near-field light to the optical disk 47. The SIL 2 is disposed such that the end surface 2a thereof is opposed to the recording surface 47a of the disk 47. The lens holder 4 is arranged in a three-axis actuator 6, which constitutes at least part of a mechanism for moving the light focusing element 5 closer to or farther away from the disk 47. The three-axis actuator 6 includes, e.g., coils in three orthogonal directions, a yoke, etc. which are not shown. When a predetermined servo voltage is applied to the three-axis actuator 6, current flows through each coil, whereby a tracking servo, focusing servo, or tilt servo operation is controlled. The focusing servo operation includes a gap servo operation. In the case where the present invention is applied to the optical disk drive 1 according to the present embodiment, the tracking servo module 52 and the tilt servo module 53 are not necessarily included.

Figure 3:
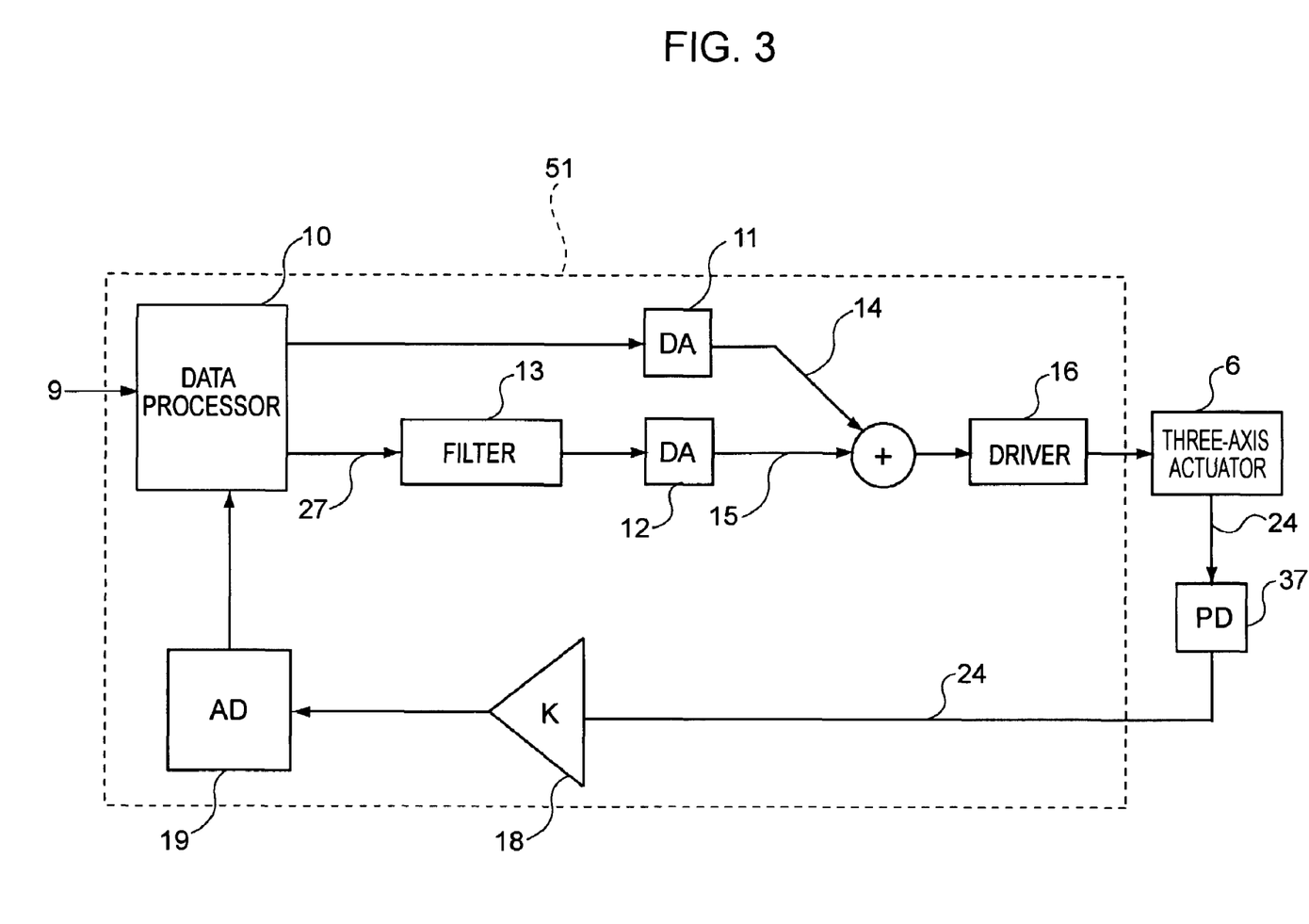
FIG. 3 is a block diagram of the configuration of a gap servo module.

FIG. 3 is a block diagram showing the outline of the gap servo module 51. A control target of the gap servo module 51 is the three-axis actuator 6. The amount to be detected (amount to be controlled) is the amount of totally reflected returning light 24, which is detected by the PD 37 as described above. The detected amount of totally reflected returning light 24 is normalized to, e.g., 1 V by a gain normalizer 18. The resultant signal is converted into digital data through an analog-to-digital (AD) converter 19. The digital data, indicating the amount of totally reflected returning light, is supplied to a data processor 10. A voltage to approach the SIL 2 of the light focusing element 5 to the optical disk 47 is output from the data processor 10. The output voltage is converted into an analog signal by a digital-to-analog (DA) converter 11 and the analog signal is output as an approach voltage 14. On the other hand, a gap error signal 27 is supplied to a filter 13. The signal is converted into an analog signal through a DA converter 12 and the resultant signal is output as a servo voltage 15. The servo voltage 15 is added to the approach voltage 14. The resultant voltage is supplied to a driver 16. The driver 16 drives the three-axis actuator 6 so that a gap error becomes zero.

Figure 4:
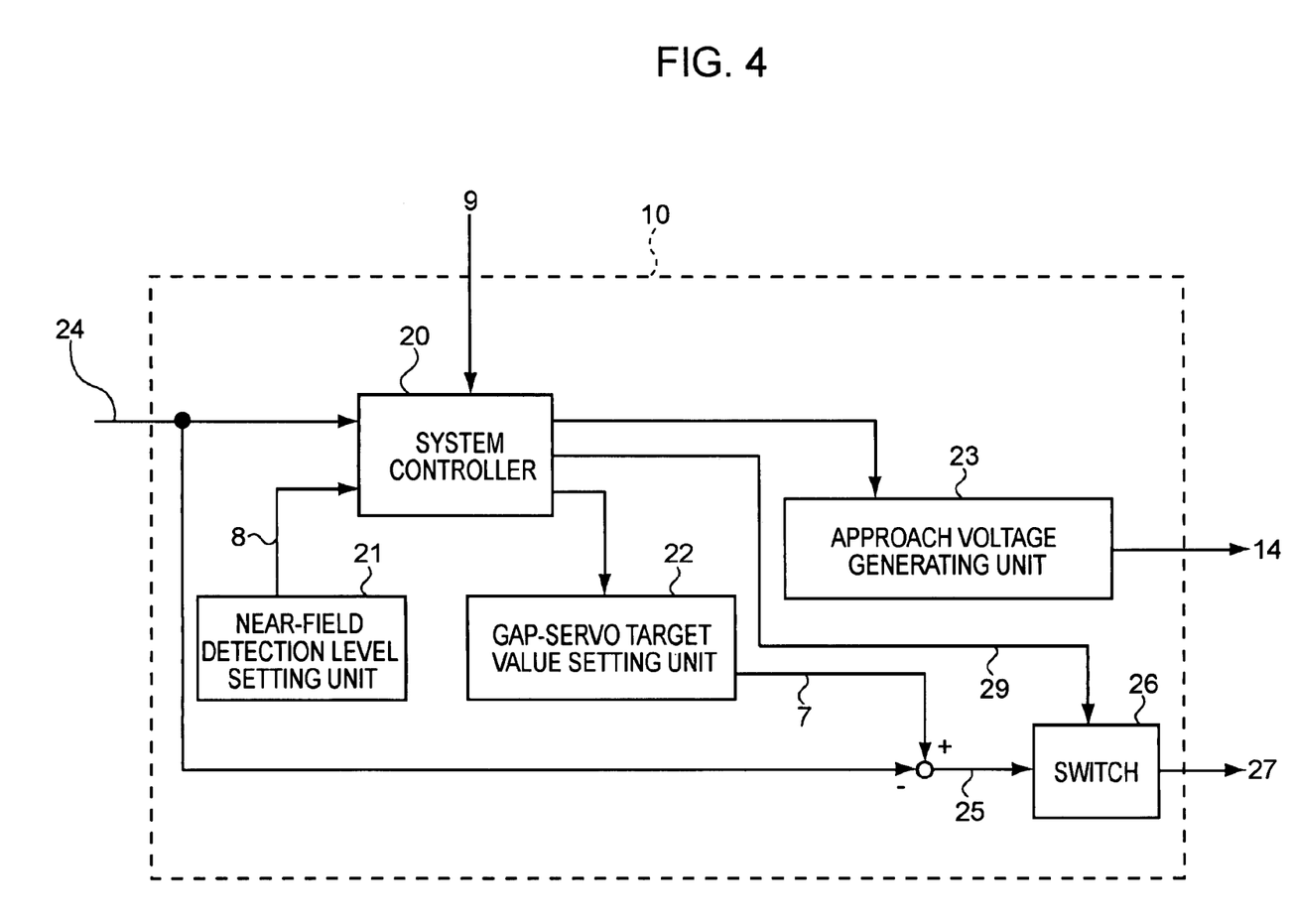
FIG. 4 is a block diagram of the configuration of a data processor.

FIG. 4 is a block diagram of the detailed configuration of the data processor 10.

The data processor 10 receives the data indicating the amount of totally reflected returning light 24 and a signal 9 output from a gap servo switch. For example, the gap servo switch signal 9 is supplied to the data processor 10 when the optical disk 47 is loaded into the optical disk drive 1. Input timing is not limited to the above.

A near-field detection level setting unit 21 sets a near-field detection level (threshold voltage to start the gap servo operation) 8 and inputs the set level 8 to a system controller 20. The system controller 20 compares the amount of totally reflected returning light 24 with the near-field detection level 8. On the basis of the result, the system controller 20 outputs predetermined control signals to an approach voltage generating unit 23 and a switch 26, as will be described below.

Figure 5:
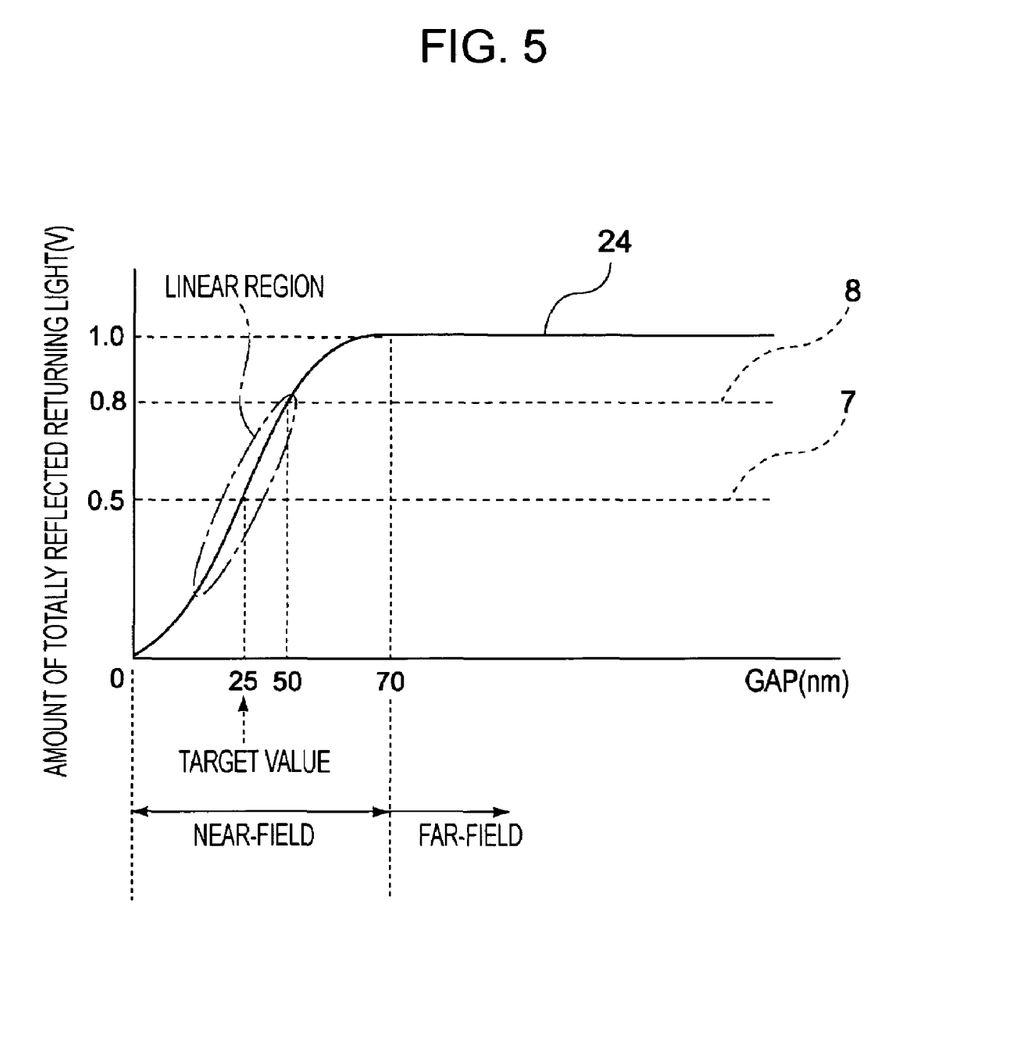
FIG. 5 is a graph showing the relationship between the amount of totally reflected returning light and a gap between the end surface of an SIL and the surface of an optical disk.

The near-field detection level 8 may be set as shown in, e.g., FIG. 5. In other words, the near-field detection level 8 is set to a value that lies within a near-field zone and is higher than a gap-servo target value 7. Referring to FIG. 5, for instance, when the amount of totally reflected returning light 24 in a far-field zone is normalized to 1 (V), the near-field detection level 8 is set to 0.8 (V) in a linear region. The gap-servo target value 7 is set by a gap-servo target value setting unit 22 (see FIG. 4). As shown in FIG. 5, the gap-servo target value 7 is set to a value that lies within the linear region and is lower than 0.8 (V), e.g., 0.5 (V).

The system controller 20 compares the near-field detection level 8 with the amount of totally reflected returning light 24, i.e., a voltage corresponding thereto. As the result of comparison by the system controller 20, when the amount of totally reflected returning light 24 is higher than the near-field detection level 8, i.e., when the end surface 2a of the SIL 2 is located in the far field, a signal 29 output from the system controller 20 to the switch 26 becomes a low level. On the other hand, when the amount of totally reflected returning light 24 is equal to or lower than the near-field detection level 8, i.e., when the end surface 2a of the SIL 2 is located in the near field, the output signal 29 becomes to a high level. At the time when the output signal 29 of the system controller 20 goes to the high level, the switch 26 is turned on, whereby the gap servo operation starts. A deviation between the amount of totally reflected returning light 24 and the gap-servo target value 7 is obtained and is supplied as a deviation signal 25 to the switch 26.

When the switch 26 is turned on, i.e., when the gap servo operation starts, the switch 26 outputs the supplied deviation signal 25 as a servo voltage 27. In the above-described gap servo operation, the gap between the end surface 2a of the SIL 2 and the recording surface 47a is controlled so that the voltage applied to the three-axis actuator 6 is equal to the gap-servo target value 7.

Figure 6:
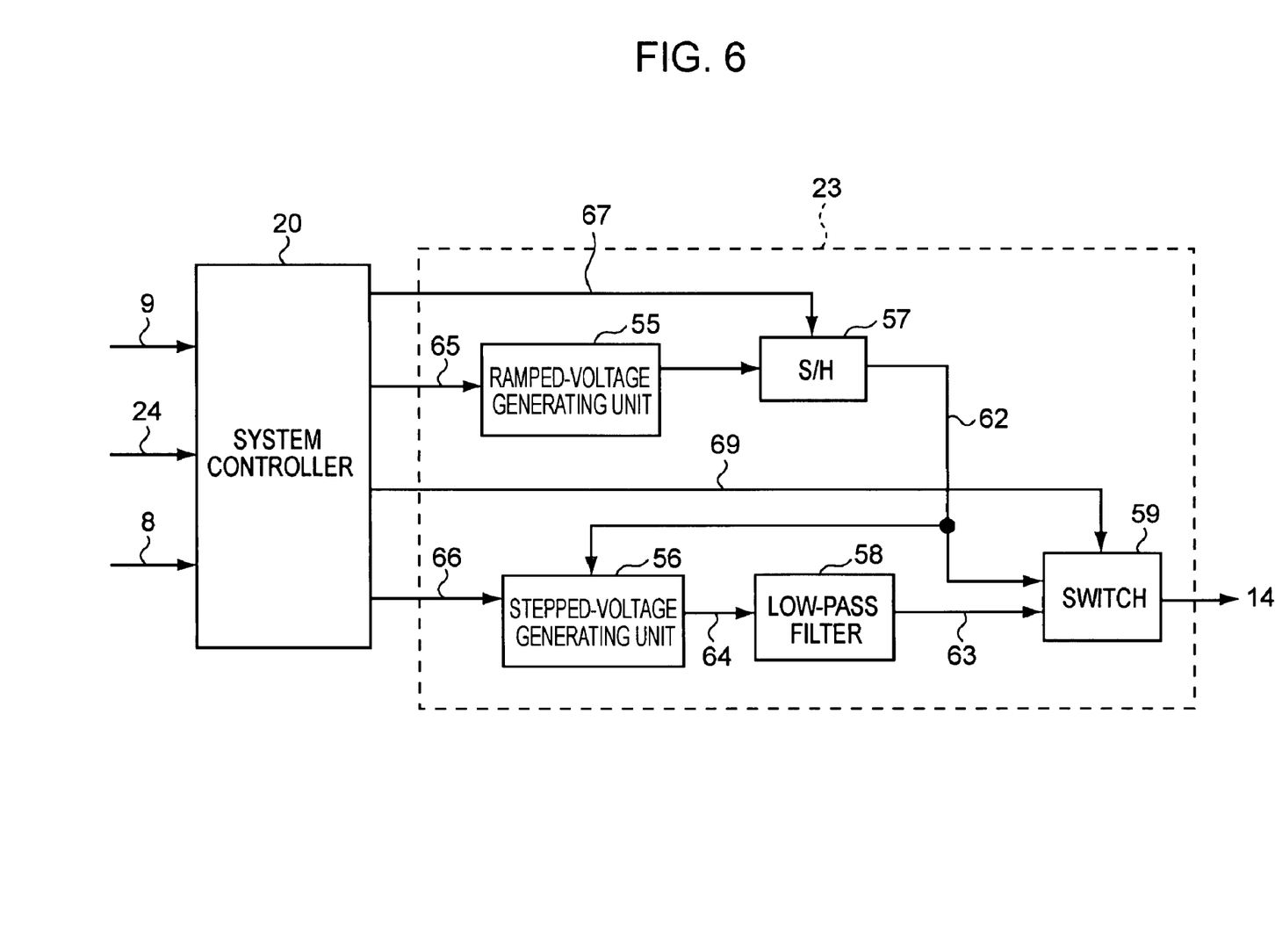
FIG. 6 is a block diagram of the configuration of an approach voltage generating unit.

FIG. 6 is a block diagram showing the configuration of the approach voltage generating unit 23. The approach voltage generating unit 23 includes a ramped-voltage generating unit 55, a sample-hold circuit 57, a stepped-voltage generating unit 56, a low-pass filter 58, and a switch 59.

When receiving a control signal 65 based on the above-described gap servo switch signal 9 from the system controller 20, the ramped-voltage generating unit 55 generates a ramped voltage, which linearly increases, and outputs the voltage to the sample-hold circuit 57.

The system controller 20 outputs a hold signal 67 to the sample-hold circuit 57 when the amount of totally reflected returning light 24 is lower than the near-field detection level 8. When receiving the hold signal 67, the sample-hold circuit 57 holds the voltage generated by the ramped-voltage generating unit 55. In addition, the sample-hold circuit 57 outputs a signal 62 corresponding to the input or held ramped voltage 62 to the switch 59 and the stepped-voltage generating unit 56.

The system controller 20 outputs a control signal 66 to the stepped-voltage generating unit 56 when the amount of totally reflected returning light 24 is lower than the near-field detection level 8. When receiving the control signal 66, the stepped-voltage generating unit 56 generates a stepped voltage and outputs a signal corresponding to the voltage 64 to the low-pass filter 58.

Figure 7:
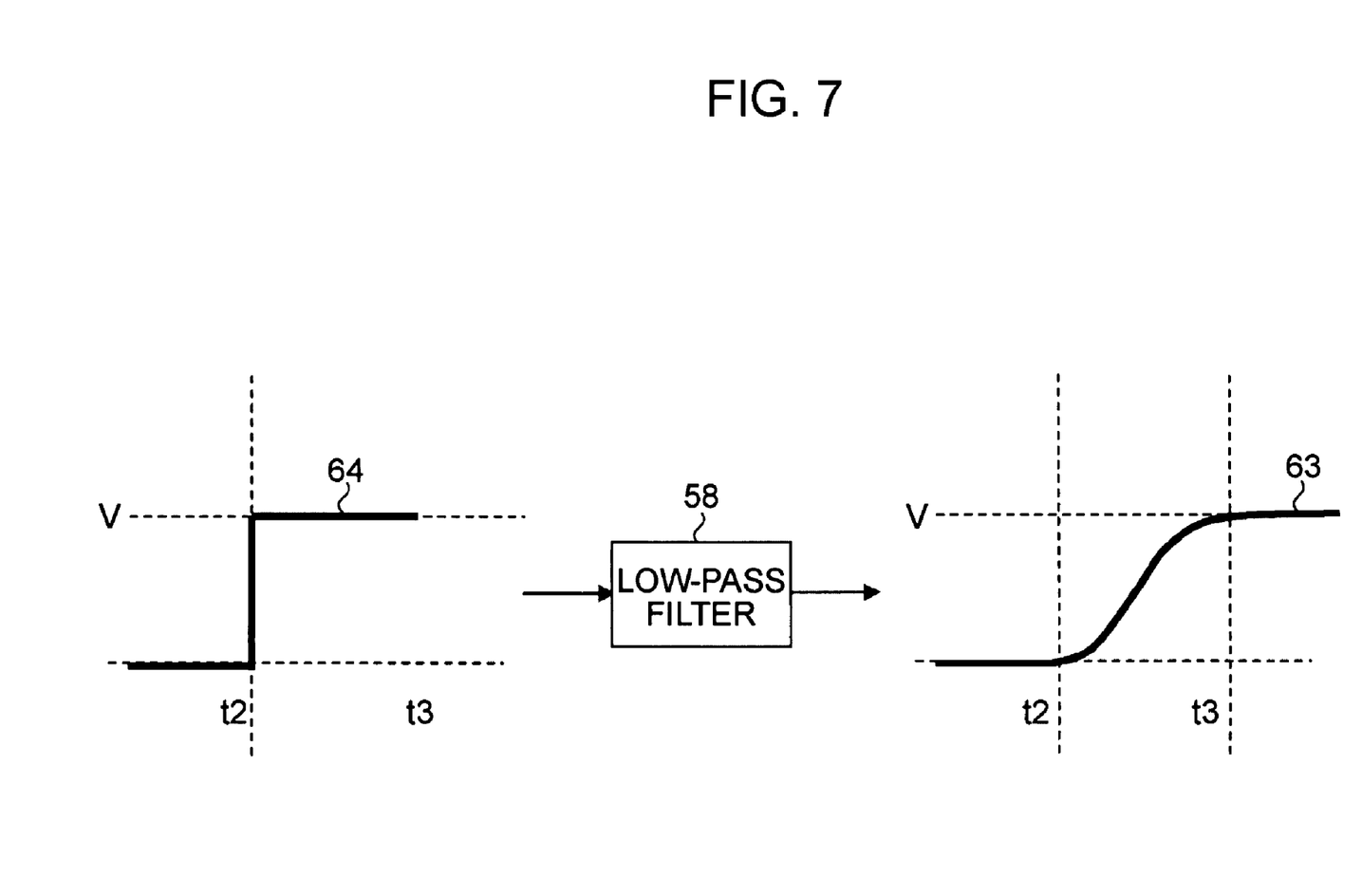
FIG. 7 is a diagram showing low-pass filtering of a stepped voltage.

As shown in FIG. 7, the low-pass filter 58 integrates the voltage signal 64 to obtain a voltage signal 63 and outputs the signal 63 to the switch 59.

In accordance with a control signal 69 from the system controller 20, the switch 59 selects either the voltage signal 62 of the sample-hold circuit 57 or the output signal 63 of the low-pass filter 58. Then, the switch 59 outputs the selected signal as the approach voltage 14.

Figure 8:
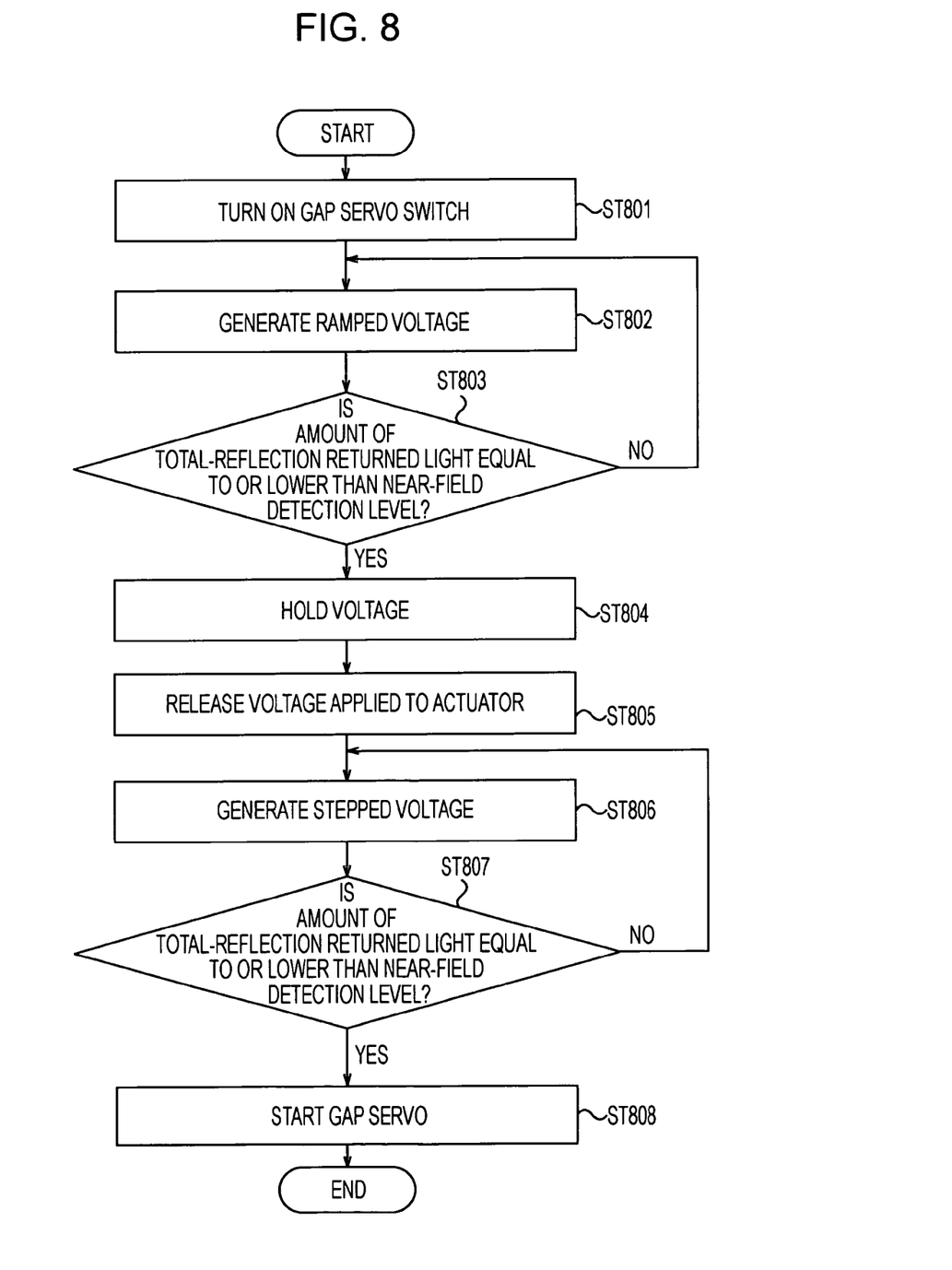
FIG. 8 is a flowchart showing an example of the operation of the gap servo module.
Figure 9:
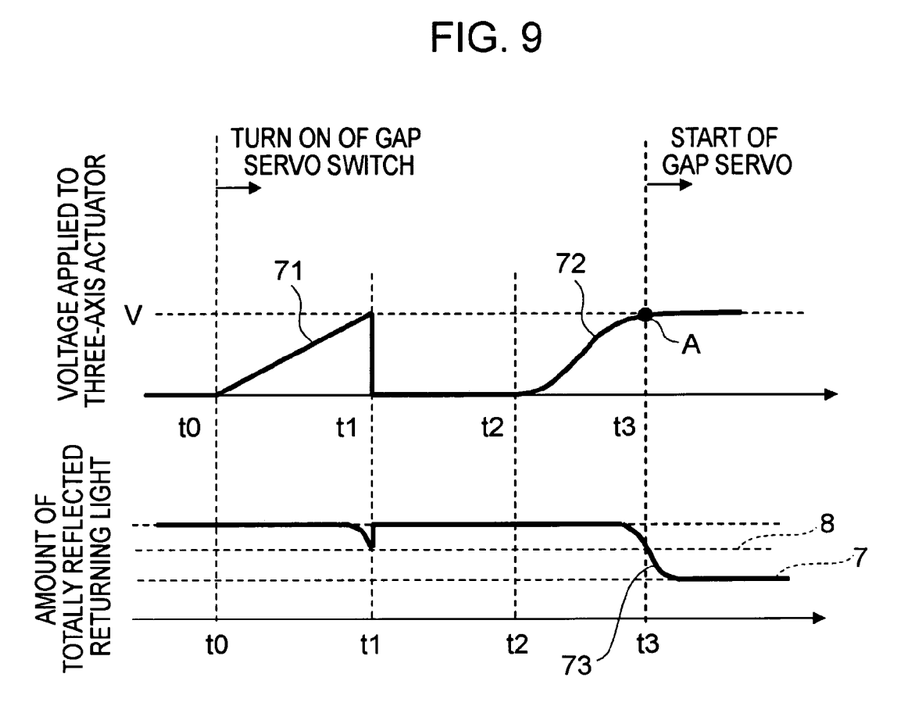
FIG. 9 is a timing diagram showing a voltage applied to a three-axis actuator and the amount of totally reflected returning light in the operation of FIG. 8.

The operation of the gap servo module 51 with the above-described configuration will now be described. FIG. 8 is a flowchart of an example of the operation thereof. FIG. 9 is a timing diagram showing a voltage applied to the three-axis actuator 6 and the amount of totally reflected returning light.

At time t0, the gap servo switch is turned on and the gap servo switch signal 9 is supplied to the system controller 20 (step 801). The system controller 20 outputs the control signal 65 to the ramped-voltage generating unit 55. In response to the control signal 65, the ramped-voltage generating unit 55 generates a ramped voltage 71 (refer to FIG. 9) (step 802). The ramped voltage 71 is supplied as the voltage signal 62 to the switch 59. The system controller 20 permits the switch 59 to output the voltage signal 62 as the approach voltage 14. The approach voltage 14 is supplied to the driver 16. The driver 16 drives the three-axis actuator 6 on the basis of the approach voltage 14. Consequently, the light focusing element 5 is moved closer to the optical disk 47 and the amount of totally reflected returning light 24 starts to drop, so that the end surface 2a of the SIL 2 enters the near field.

As shown in FIG. 5, at time t1 when a voltage corresponding to the amount of totally reflected returning light 24 is equal to or lower than 0.8 V which corresponds to the near-field detection level 8 (YES in step 803), the system controller 20 outputs the hold signal 67 to the sample-hold circuit 57. In response to the hold signal 67, the sample-hold circuit 57 holds the input ramped voltage (step 804). Referring to FIG. 9, let V (V) denote the held voltage. Simultaneously with outputting of the hold signal 67, the system controller 20 switches the switch 59 to temporarily release the ramped approach voltage 14 applied up to that time (step 805).

After that, the system controller 20 outputs the control signal 66 to the stepped-voltage generating unit 56. As described above, the signal 66 is used to generate a stepped voltage through the stepped-voltage generating unit 56. In response to the control signal 66, the stepped-voltage generating unit 56 generates a stepped voltage (refer to FIG. 7) at time t2 (step 806). The stepped voltage is increased to the voltage V (V) at maximum. Data indicating the held voltage V (V) may be stored in, e.g., a memory (not shown) included in the system controller 20, alternatively, another memory. The stepped voltage is supplied to the switch 59 through the low-pass filter 58. The supplied voltage is applied as the approach voltage 14 to the three-axis actuator 6. Since the approach voltage 14 of up to the maximum voltage V (V) is applied after time 2, when the end surface 2a of the SIL 2 reaches a position, corresponding to the near-field detection level 8, close to the optical disk 47, the velocity of the SIL 2 becomes approximately zero (shown by point A at time t3). When the voltage corresponding to the amount of totally reflected returning light 24 is equal to or lower than the voltage corresponding to the near-field detection level 8 (YES in step 807), the system controller 20 turns on the switch 26 to output a servo voltage 27 on the basis of the gap-servo target value 7 set by the target value setting unit 22, thus starting the gap servo operation (step 808).

Figure 10:
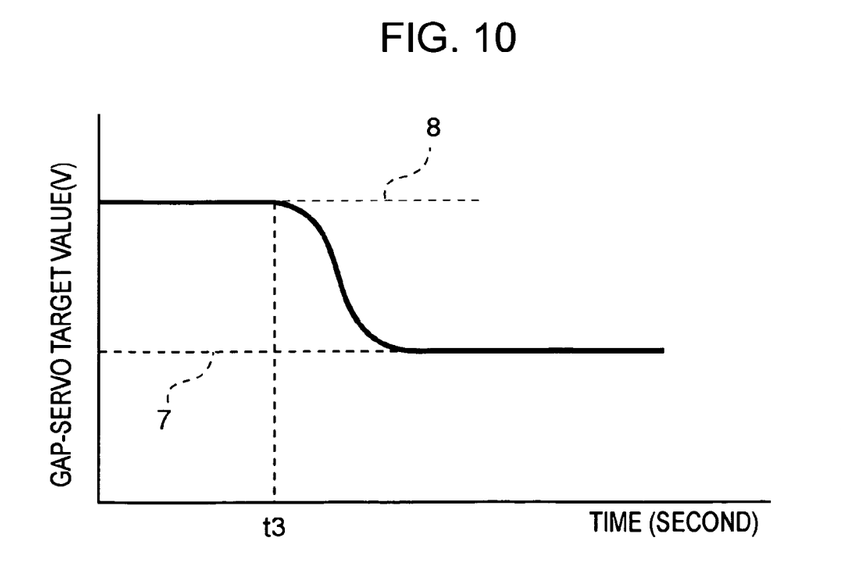
FIG. 10 is a diagram of a change in gap-servo target value generated by a gap-servo target value setting unit.

FIG. 10 shows a change in gap-servo target value generated by the gap-servo target value setting unit 22. While the approach voltage 14 having the constant value V (V) is being applied to the three-axis actuator 6, the system controller 20 starts the gap servo operation on the basis of the gap-servo target value so as to follow the target value.

As described above, according to the present embodiment, at time t3 when the gap servo operation is started, the initial velocity of the SIL 2 is zero. The gap servo operation is started under the condition that the initial velocity of the SIL 2 is zero. Therefore, the SIL 2 can be moved closer to the disk 47 such that the applied voltage smoothly follows the gap-servo target value 7 as shown by a waveform 73 indicating the amount of totally reflected returning light in FIG. 9.

According to the present embodiment, while the approach voltage 14 is applied to the three-axis actuator 6 and the end surface 2a of the SIL 2 is located in the near field, a voltage obtained by adding the servo voltage 27 to the approach voltage 14 is applied to the three-axis actuator 6. Thus, the light focusing element 5 can be smoothly moved closer to the disk 47.

In a conceivable method, before the approach voltage 14 is applied, the initial position of the light focusing element 5 (the SIL 2) is previously set so that the initial velocity of the SIL 2 becomes approximately zero at the time when the near-field detection level is detected. In this method, however, the initial position has to be determined by trial and error. According to the present embodiment, since automatic control can be performed, it is unnecessary to design the arrangement in consideration of the type of disk drive and the type of disk.

The present invention is not limited to the above-described embodiment but many modifications and variations are possible.

Examples of the arrangement and functions of the optical system of the optical head 28 and the sensors include, but are not limited to, those shown in FIG. 1.

In FIG. 8, a ramped voltage is applied in step 802 and a stepped voltage is applied in step 806. Voltage waveforms are not limited to those. Similar voltage waveforms may be used. For example, in step 802, a stepped voltage may be filtered by a low-pass filter and the resultant voltage may be applied. In step 806, a ramped voltage may be filtered through a low-pass filter with a relatively small time constant and the resultant voltage may be applied.

In FIG. 9, the maximum voltage V is released at time t1 and the application of the approach voltage is restarted at time t2. For example, if data indicating the maximum voltage V is temporarily stored, the following operation may be omitted: After the optical disk 47 is loaded into the optical disk drive, the ramped voltage 71 is applied and is then released every writing or reading operation. In other words, if the data indicative of the maximum voltage V is stored once, the second or later writing or reading operation may be started at time t2. When another disk is loaded, data indicating the maximum voltage V may be updated. It is a matter of course that the above-described operation may be started at time t0 and data indicating the maximum voltage V may be recorded every writing or reading operation with respect to one disk.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disk drive comprising:
   a light source that emits light;
   a light focusing element arranged so as to be opposed to a disk on which a signal is recordable, the light focusing element being capable of focusing the light emitted from the light source as near-field light on the disk;
   a moving mechanism for moving the light focusing element closer to or farther away from the disk on the basis of a change in voltage;
   detecting means for detecting a distance between the disk and the light focusing element by detecting a total-reflection return-light quantity of light emitted from the light source and totally reflected by the light focusing element, and for determining, based on the detected total-reflection return-light quantity, a state where the moving mechanism approaches the light focusing element to the disk such that the distance between the light focusing element and the disk is equal to a first distance where the light is focused as near-field light on the disk through the light focusing element and outputting a detection signal upon detecting the state;
   holding means for holding a voltage applied to the moving mechanism in response to the detection signal output from the detecting means, the holding means being capable of releasing the held voltage;
   first control means for performing a first control operation of applying a voltage, whose maximum value is equal to the held voltage, to the moving mechanism so that the distance between the light focusing element and the disk is equal to or smaller than the first distance while the held voltage is released; and
   second control means for performing a second control operation of controlling the distance between the light focusing element and the disk to a second distance smaller than the first distance on the basis of the detection signal while the distance therebetween is equal to or smaller than the first distance.

2. The optical disk drive according to claim 1, further comprising:
   switching means for switching from the first control operation by the first control means to the second control operation by the second control means in response to a detection signal output from the detecting means.

3. The optical disk drive according to claim 1, wherein the second control means performs the second control operation while the maximum voltage is being applied to the moving mechanism through the first control means.

4. The optical disk drive according to claim 1, wherein the light focusing element includes a solid immersion lens.

5. The optical disk drive according to claim 1, wherein the light emitted from the light source is blue or blue-violet laser light.

6. An optical disk apparatus comprising:
   a light source that emits light;
   a light focusing element arranged so as to be opposed to a disk on which a signal is recordable, the light focusing element being capable of focusing the light emitted from the light source as near-field light on the disk;
   a moving mechanism for moving the light focusing element closer to or farther away from the disk on the basis of a change in voltage;
   detecting means for detecting a distance between the disk and the light focusing element by detecting a total-reflection return-light quantity of light emitted from the light source and totally reflected by the light focusing element, and for determining, based on the detected total-reflection return-light quantity, a state where the moving mechanism approaches the light focusing element to the disk such that the distance between the light focusing element and the disk is equal to a first distance where the light is focused as near-field light on the disk through the light focusing element and outputting a detection signal upon detecting the state;
   holding means for holding a voltage applied to the moving mechanism in response to the detection signal output from the detecting means, the holding means being capable of releasing the held voltage;
   first control means for performing a first control operation of applying a voltage, whose maximum value is equal to the held voltage, to the moving mechanism so that the distance between the light focusing element and the disk is equal to or smaller than the first distance while the held voltage is released;
   second control means for performing a second control operation of controlling the distance between the light focusing element and the disk to a second distance smaller than the first distance on the basis of the detection signal while the distance therebetween is equal to or smaller than the first distance; and
   a writing/reading mechanism capable of performing at least one of writing and reading of the signal to/from the disk while the distance therebetween is being controlled to the second distance through the second control means.

7. The optical disk apparatus according to claim 6, further comprising:

switching means for switching from the first control operation by the first control means to the second control operation by the second control means in response to a detection signal output from the detecting means.

8. The optical disk apparatus according to claim 6, wherein the second control means performs the second control operation while the maximum voltage is being applied to the moving mechanism through the first control means.

9. The optical disk apparatus according to claim 6, wherein the light focusing element includes a solid immersion lens.

10. The optical disk apparatus according to claim 6, wherein the light emitted from the light source is blue or blue-violet laser light.

11. A method for driving an optical disk drive including a light source that emits light, a light focusing element which is arranged so as to be opposed to a disk on which a signal is recordable and is capable of focusing the light emitted from the light source as near-field light on the disk, and a moving mechanism for moving the light focusing element closer to or farther away from the disk on the basis of a change in voltage, the method comprising:

detecting a distance between the disk and the light focusing element by detecting a total-reflection return-light quantity of light emitted from the light source and totally reflected by the light focusing element, and for determining, based on the detected total-reflection return-light quantity, a state where the moving mechanism approaches the light focusing element to the disk such that the distance between the light focusing element and the disk is equal to a first distance where the light is focused as near-field light on the disk through the light focusing element;

outputting a detection signal when the state is detected;

holding a voltage applied to the moving mechanism in response to the detection signal;

releasing the held voltage;

performing a first control operation of applying a voltage, whose maximum value is equal to the held voltage, to the moving mechanism so that the distance between the light focusing element and the disk is equal to or smaller than the first distance while the held voltage is released; and performing a second control operation of controlling the distance between the light focusing element and the disk to a second distance smaller than the first distance on the basis of the detection signal while the distance therebetween is equal to or smaller than the first distance.

12. An optical disk drive comprising:

a light source that emits light;

a light focusing element arranged so as to be opposed to a disk on which a signal is recordable, the light focusing element being capable of focusing the light emitted from the light source as near-field light on the disk;

a moving mechanism for moving the light focusing element closer to or farther away from the disk on the basis of a change in voltage;

a detecting unit for detecting a distance between the disk and the light focusing element by detecting a total-reflection return-light quantity of light emitted from the light source and totally reflected by the light focusing element, and for determining, based on the detected total-reflection return-light quantity, a state where the moving mechanism approaches the light focusing element to the disk such that the distance between the light focusing element and the disk is equal to a first distance where the light is focused as near-field light on the disk through the light focusing element and outputting a detection signal upon detecting the state;

a holding unit for holding a voltage applied to the moving mechanism in response to the detection signal output from the detecting unit, the holding unit being capable of releasing the held voltage;

a first control unit for performing a first control operation of applying a voltage, whose maximum value is equal to the held voltage, to the moving mechanism so that the distance between the light focusing element and the disk is equal to or smaller than the first distance while the held voltage is released; and a second control unit for performing a second control operation of controlling the distance between the light focusing element and the disk to a second distance smaller than the first distance on the basis of the detection signal while the distance therebetween is equal to or smaller than the first distance.

13. An optical disk apparatus comprising:

a light source that emits light;

a light focusing element arranged so as to be opposed to a disk on which a signal is recordable, the light focusing element being capable of focusing the light emitted from the light source as near-field light on the disk;

a moving mechanism for moving the light focusing element closer to or farther away from the disk on the basis of a change in voltage;

a detecting unit for detecting a distance between the disk and the light focusing element by detecting a total-reflection return-light quantity of light emitted from the light source and totally reflected by the light focusing element, and for determining, based on the detected total-reflection return-light quantity, a state where the moving mechanism approaches the light focusing element to the disk such that the distance between the light focusing element and the disk is equal to a first distance where the light is focused as near-field light on the disk through the light focusing element and outputting a detection signal upon detecting the state;

a holding unit for holding a voltage applied to the moving mechanism in response to the detection signal output from the detecting unit, the holding unit being capable of releasing the held voltage;

a first control unit for performing a first control operation of applying a voltage, whose maximum value is equal to the held voltage, to the moving mechanism so that the distance between the light focusing element and the disk is equal to or smaller than the first distance while the held voltage is released;

a second control unit for performing a second control operation of controlling the distance between the light focusing element and the disk to a second distance smaller than the first distance on the basis of the detection signal while the distance therebetween is equal to or smaller than the first distance; and a writing/reading mechanism capable of performing at least one of writing and reading of the signal to/from the disk while the distance therebetween is being controlled to the second distance through the second control unit.

\* \* \* \* \*